US006632463B1

(12) United States Patent
Townsend

(10) Patent No.: US 6,632,463 B1
(45) Date of Patent: *Oct. 14, 2003

(54) METHOD AND MEANS FOR INJECTING FLUID INTO A MEAT PRODUCT

(75) Inventor: Ray T. Townsend, Des Moines, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/060,012

(22) Filed: Apr. 14, 1998

Related U.S. Application Data

(63) Continuation of application No. 08/718,987, filed on Sep. 26, 1996, now abandoned, which is a continuation of application No. 08/839,054, filed on Apr. 23, 1997, now Pat. No. 5,738,004.

(51) Int. Cl.[7] ................................. A23L 1/31
(52) U.S. Cl. .................. 426/281; 426/231; 426/442; 426/650; 426/652; 426/654; 426/641; 99/533
(58) Field of Search .................. 426/281, 332, 426/323, 442, 231, 541, 650, 652, 654, 641; 99/533

(56) References Cited

U.S. PATENT DOCUMENTS

| 3,675,567 A | 7/1972 | Rejsa et al. ............... 92/257 |
| 3,863,556 A | 2/1975 | Townsend ................. 99/487 |
| 3,919,931 A | 11/1975 | Liljenberg ................. 99/533 |
| 3,922,357 A | 11/1975 | Townsend ................. 426/281 |
| 4,142,000 A | 2/1979 | Townsend ................. 426/281 |
| 4,220,669 A | 9/1980 | Townsend ................. 426/281 |
| 4,254,151 A | 3/1981 | Townsend ................. 426/231 |
| 4,286,510 A | 9/1981 | Prosenbauer ............... 99/533 |
| 4,292,889 A | 10/1981 | Townsend ................. 99/533 |
| 4,455,928 A | 6/1984 | Townsend ................. 99/533 |
| 4,487,119 A | 12/1984 | Townsend ................. 99/487 |
| 4,903,590 A | 2/1990 | Muller et al. .............. 99/487 |

*Primary Examiner*—Milton I. Cano

(57) ABSTRACT

A machine for injecting fluid into a meat product has a frame and a meat injection station on the frame. An elongated conveyor is mounted on the frame for carrying a meat products towards and through the injection station. A motor is on the frame for operating the conveyor. A meat injection head on the frame is located at the injection station and includes a plurality of downwardly extending fluid injection needles. A fluid reservoir is mounted on the frame and is connected to a pump, with the pump also being connected to the needles. The motor is connected to a power train for moving the needles into and out of a meat product while it is being moved through the injection station by the conveyor. A bypass control circuit is on the frame and is connected to the pump and the reservoir for diverting fluid moving towards the needles from the pump in the reservoir when the needles are out of the meat product. A method of injecting fluid into a meat product comprising continuously longitudinally moving a meat product having an upward surface through a meat injection station, and injecting fluid at spaced points over the upper surface into the meat product while the meat product is moving through the meat injection station.

2 Claims, 17 Drawing Sheets

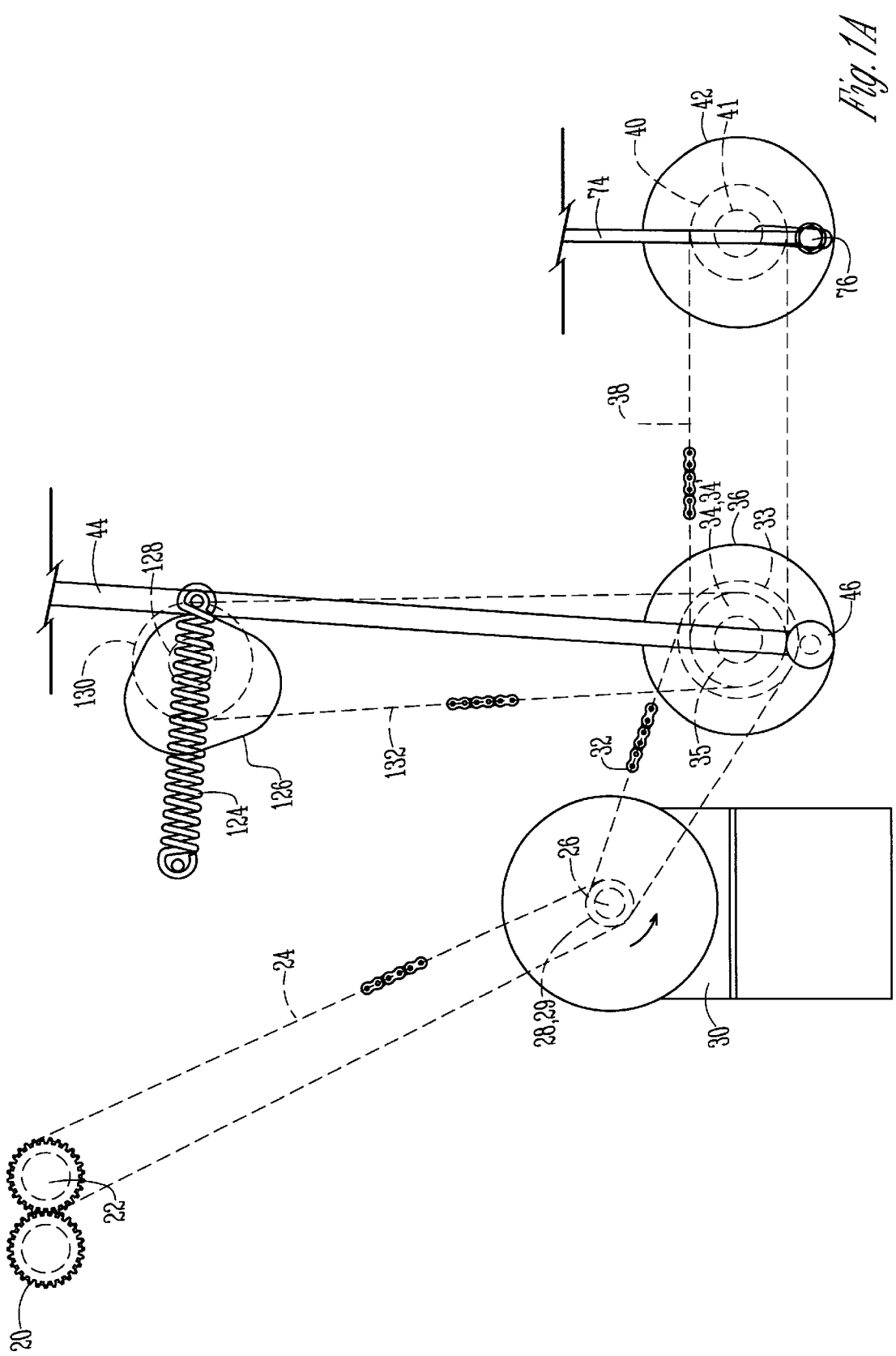

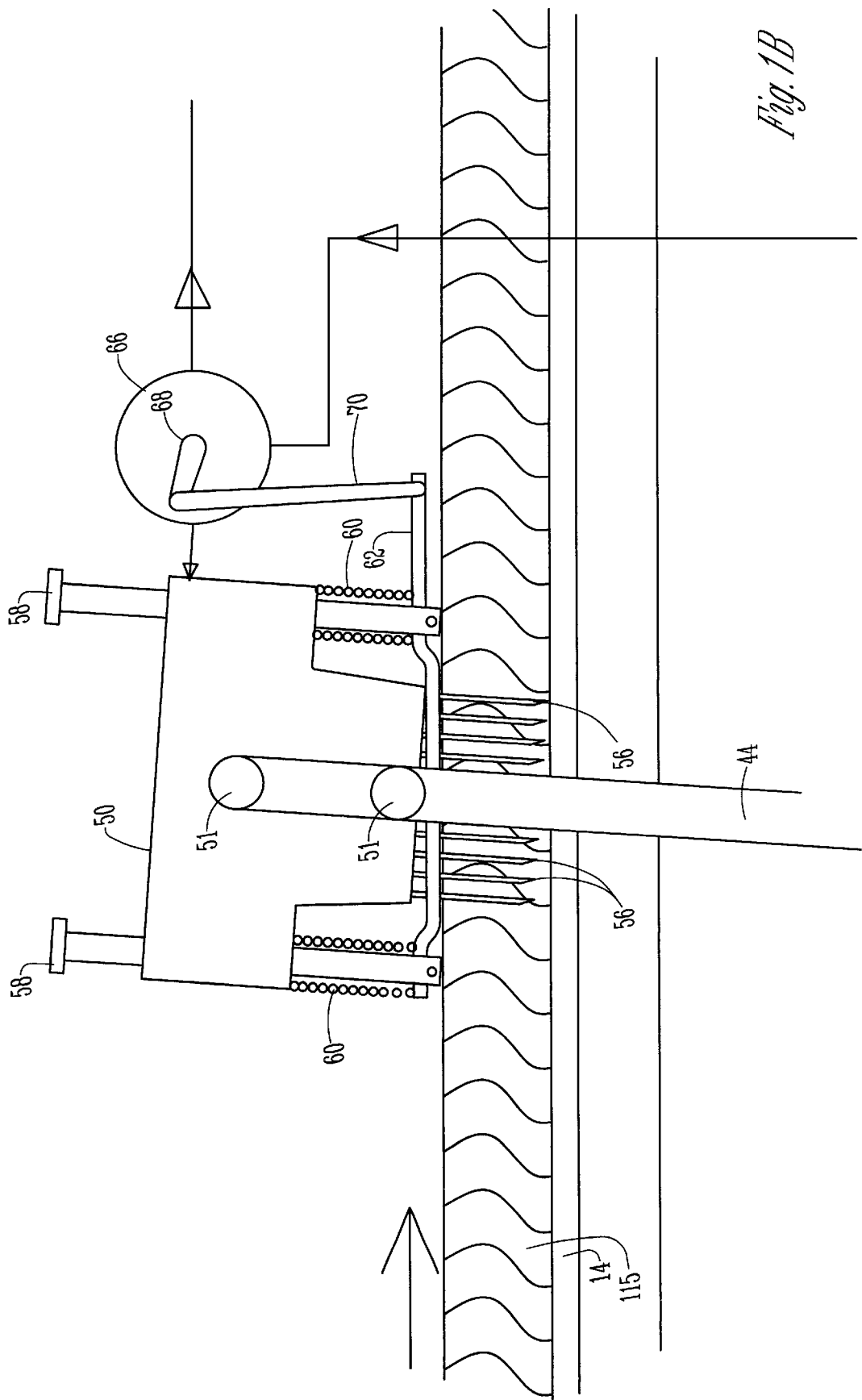

METHOD AND MEANS FOR INJECTING FLUID INTO A MEAT PRODUCT

This application is continuation of U.S. Pat. No. 08/718,987 filed on Sept. 26, 1996, now abandoned and continuation of 08/839,054 file on Apr. 23, 1997, now U.S. Pat. No. 5,738.004.

BACKGROUND OF THE INVENTION

Pork bellies are injected with a curing solution, called pickle, in order to make bacon. Conventional injection machines have a vertically reciprocating crosshead with multiple needles. The crosshead is typically driven by a crank. A normal conveyor carries the bellies under the needles and is moved intermittently ahead when the needles are removed so that a pattern of intermittent injections are made in the bellies as they incrementally move under the needles, and are then injected as they become stationary between intervening movements.

The needles project down through to the bottom of the belly as the belly lays on the stationary conveyor and then the needles stop and reverse direction and return upward out of the bellies. The needles and crosshead continue their upward stroke above the bellies while the conveyor moves forward to place the belly for another injection. Also, as the needles clear the top of the bellies, the stripper plate that held the bellies in place is raised by the crosshead to allow movement of the belly under the needles.

The pump for the pickle is usually a positive displacement pump and pumps pickle through the needles at a constant rate. When the needles are out of the bellies, the pickle is usually allowed to continue to run from the needles and is collected underneath the bellies and re-filtered and fed back into the reservoir to be used again.

Such fluid injection machines for meat products have been used for many years, but they have several negative factors, one of which is very detrimental. The distribution of pickle throughout the belly should be as uniform as possible. That means that every cubic centimeter should have the same amount of pickle throughout the entire belly. When the crosshead and needles are moved up and down by a crank mechanism, the velocity of the needles is constantly changing from zero to maximum and back to zero, etc. as the needles move up and down in the belly. With a constant flow pump, the bellies get more or less pickle per cubic centimeter, depending on the velocity of the needles in moving into and out of the meat.

Stated differently pickle is generally supplied into the injector head by a positive displacement pump with constant flow rate. The needles driven by a rotational crank travel at a variable speed through the thickness. When needles are near either top or bottom position, the needle traveling speed is close to zero, while at the middle stroke needles travel at the highest speed. More pickle is injected per unit length of travel when needles are moving at slow speed and less pickle is injected at high speed. It is highly desirable to inject equal amount of pickle per unit length of thickness to achieve the best quality of injection.

Another negative feature of past injection machines is the bad inertial forces that build up in the conveyor as it starts and stops. The conveyor with its load of bellies must be stopped when the needles are injecting pickle into the belly. When the needles are out of the belly, the conveyor must move ahead to place the belly in position for another injection by the needles. This arrangement necessitates continual starting and stopping of the conveyor with its heavy load of bellies, and this is very undesirable. Since the injector head moves in a nearly vertical direction, the conveyor has to stop during the injection process to allow needles to penetrate into and out of pork bellies without introducing the lateral motion. This intermittent motion of the conveyor accelerates and decelerates pork bellies and creates inertia forces to shake the whole injector machine. The noise level generated from injection operation will be greatly reduced if the conveyor has a continuous motion.

Another problem with past injectors is the flow of pickle when the needles are out of the bellies. Some injectors allow the pickle to continue to run out of needles where it is collected and returned to the reservoir. Other injectors start the flow after the needles start into the bellies and shut off the flow as the needles are coming out of the bellies. This starting and stopping of the flow is an inertial problem. Also, letting the pickle flow continuously and catching it and returning it to the reservoir is undesirable.

Therefore, it is a principal object of this invention to inject meat products with a fluid as the meat moves continuously through a fluid injection station without having to stop the meat product while it is being injected.

A further object of the invention is to inject a meat product with a battery of needles by pumping the fluid constantly, with fluid going into the injecting needles while they are in the meat product, and with the fluid bypassing the needles and returning to the fluid reservoir when the needles are out of the product.

A further object of this invention is to create a uniform pickle injection through the thickness of pork bellies by using a double action piston pump with its output flow rate matching the velocity of the injecting needles.

A further object of this invention is to eliminate the inertia load created by the intermittent motion of the conveyor and pork bellies placed on the conveyor by using a continuously moving conveyor to carry pork bellies.

A further object of this invention is to develop a driving mechanism so that the lateral motion of the injector head during the injecting process matches the linear speed of the conveyor and the injector head is returned back to its beginning position for next cycle while needles are out of pork bellies.

A further object of this invention is to control the pickle flow into the injecting needles only during the injecting process and to direct the pickle flow back into reservoir without starting or stopping the piston pump and pickle flow.

A further object of this invention is to adjust the output flow rate of the piston pump to achieve desired percentage of pickle injection.

SUMMARY OF THE INVENTION

The injector machine of this invention includes a system of allowing the conveyor to run continuously at a constant speed, so that the conveyor with the weight of the bellies is moving at a constant rate rather than an intermittent motion that causes undesirable inertial forces. Because the conveyor and the bellies are moving at a constant speed, the crosshead with the needles must also move forward with the conveyor and bellies whenever the needles are pierced into the bellies. This means that the crosshead and needles must be moving forward with the bellies at the same speed anytime that the needles are being inserted or pulled out of the bellies. Then as the crosshead and needles continue their upward stroke above the bellies, the crosshead is moved back to the starting position and the needles move down to the bellies. The crosshead and needles still continue to move by a crank action that starts from zero velocity at the upper center of the stroke and gradually increases to a fast velocity in the middle of the stroke, and then again decelerates to zero at the bottom of the stroke, and from there accelerates and decelerates again to the top position of the stroke. This arrangement allows for the conveyor with the bellies to move at a continuous, constant velocity. While the needles are inserting and withdrawing, they inject pickle both on the way in and the way out, as long as they are in the belly.

To facilitate this coordinated motion of the bellies and the needle crosshead, a long pitman arm is located at each end of the crosshead and is driven in a reciprocating motion from a crank. Then as the crosshead with the needles is going up and down, a cam works against the pitman arms on the ends of the crosshead to move the crosshead back and forth as needed to assure that the needle speed corresponds with the belly speed whenever the needles are in the bellies. The crosshead and needle assembly are made as light as possible to give a small mass being reciprocated back and forth as the crosshead is going up and down.

Bellies are a combination of fat and lean, but it is desirable to have the same amount of pickle (brine solution) in each cubic centimeter of belly. This would be a simple matter if the needles were moving at a constant speed as they descend and ascend in and out of the bellies. Crank action is more practical for a reciprocating motion like this, but in that case the needles are changing velocity constantly. The constant change in velocity of the needles means that the time that a needle is passing through each vertical centimeter will constantly be changing from fast to slow to fast to slow. Thus, the flow of pickle should also change accordingly. This invention accomplishes this goal by using a double action piston type pump where the piston is controlled or synchronized by the same drive as the needles. That piston pump is timed exactly with the needle crank, so that the action of the piston pump corresponds with the timing of the crank action that drives the needles. This assures that the flow of pickle from the pump at any instant of time will correspond with the velocity of the needles at that same instant of time. Therefore, the amount of pickle injected into every portion of the belly will be constant and uniform throughout the bellies in spite of the variation in velocity of the needles due to the crank action. This is a very important principle because it allows for the use of an efficient crank action to reciprocate the needles and still gives a flow of pickle that corresponds to the velocity of the needles at all times.

The pump is not a constant flow but rather a piston pump which is driven by a crank mechanism. This piston crank mechanism is timed with the needle crank mechanism so that when the needles are moving fast through the bellies, the piston crank mechanism is moving the piston of the pump at a comparable fast velocity. This assures that the amount of pickle flowing through the needles is always comparable to the velocity of the needles and is therefore uniformly distributed evenly through the belly in spite of the varying velocity of the needles. This feature of this invention eliminates the biggest objection to the past injectors as mentioned above.

The machine has a switch valve that is controlled by the stripper plate so that as the needles come out of the bellies and the stripper plate begins to rise off the bellies, the pickle from the pump is switched by the stripper plates from the crosshead and needles to the reservoir until the needles are starting into the bellies again, and are-ready for the pickle to flow through the needles again into the bellies. At this time, the switch valve switches the pickle back to the needles instead of the reservoir. Switching the pickle from the pump back and forth between the needles and the reservoir allows for a continuous flow from the pump and maintains the velocity relationship of the flow between the pump and the needle velocity.

In summary, the injector machine of this invention includes:

1. A conveyor running continuously at a constant speed to eliminate the inertia load while carrying the pork bellies through the injection process.
2. A double action piston pump synchronously driven by the same crank mechanism as the injector head so that the output flow rate of the pickle matches the motion of injecting needles to achieve uniform pickle injection through the thickness of pork bellies.
3. A crank driving mechanism and a cam-spring control mechanism to move the injector head in both vertical and lateral directions simultaneously. The vertical motion of the injector head accomplishes the injection process with needles penetrating into and retracting from pork bellies; the lateral motion of the injector head matches the forwarding motion of the conveyor during the injection process and returns the injector head back to its beginning position while needles are out of bellies.
4. A directional valve switch to control pickle flowing either into injecting needles or reservoir. During the injection process, the movement of the stripper plate relative to the tip of needles directs the pickle flowing into injecting needles. When needles are out of meat, the stripper plate actuates the valve to direct pickle back to reservoir.

BRIEF DESCRIPTION OF THE DRAWINGS

FIG. 1A is a view similar to that of FIG. 1 but showing the drive train of the injection machine in more detail;

FIG. 1B is an enlarged scale view of the upper portion of FIG. 1;

DESCRIPTION OF THE PREFERRED EMBODIMENT

Figure 1:
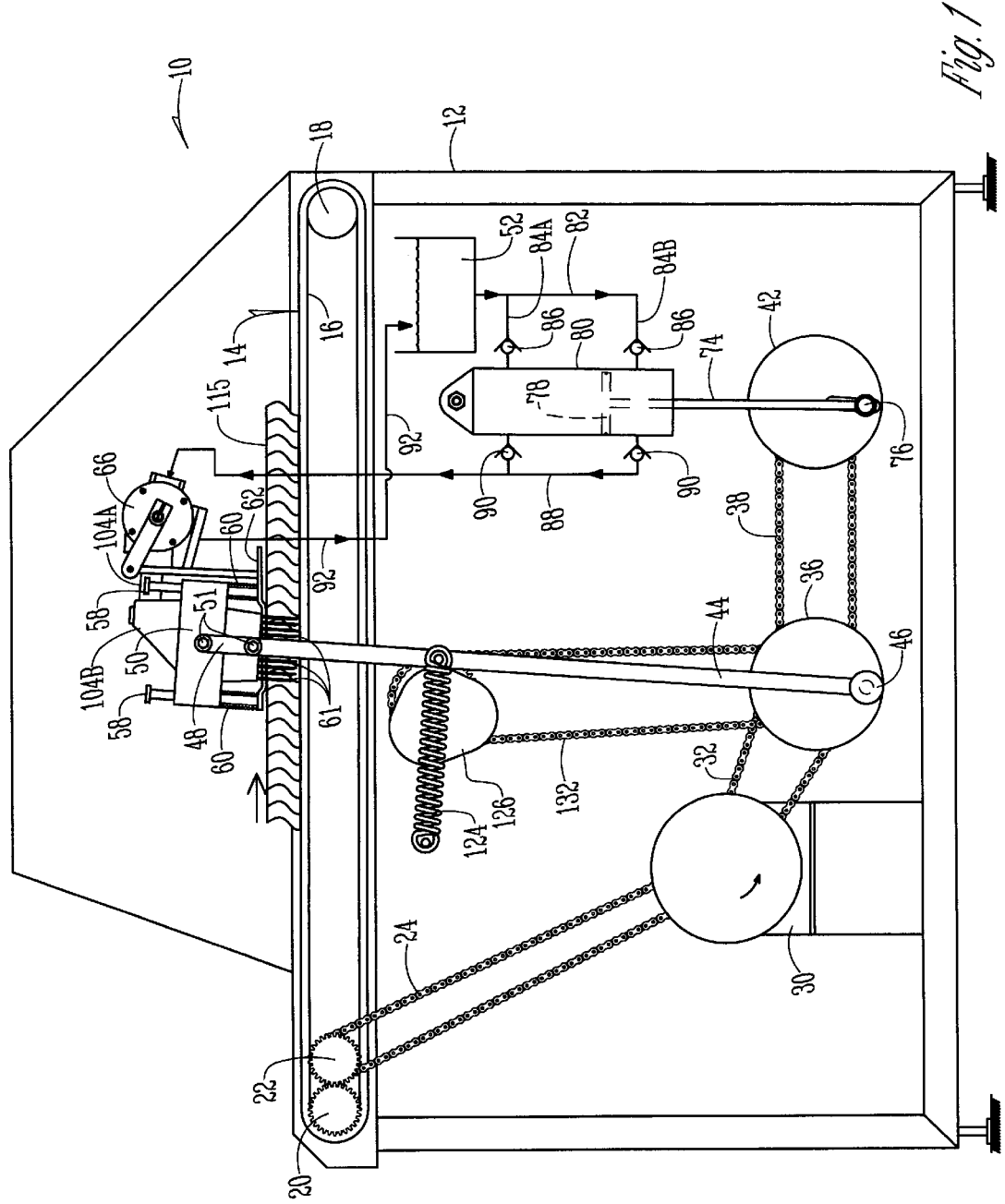
FIG. 1 is a longitudinal sectional view of the injection machine of this invention.

With reference to FIGS. 1 and 1A, the injection machine 10 has a frame 12. A horizontal conveyor 14 is mounted on the top of the machine 10 and is comprised of a continuous belt 16 of suitable construction which is threaded around pulley 18 and pulley 20. Pulley 20 has a gear on one end thereof which is in mesh with gear 22 which is rotatably mounted about a horizontal axis. Chain 24 extends around gear 22 (which is in mesh with the gear on pulley 20) and extends around an appropriate double gear 28, 29 on the output shaft 26 of motor 30. A further chain 32 extends from gear 28, 29 towards and around a triple gear 33, 34, 34' on shaft 35 which is horizontally mounted on frame 12. A cam plate 36 is rigidly secured to the gear 33 to rotate therewith. Chain 38 extends from double gear 34 and extends around gear 40 mounted on horizontal shaft 41 which is also mounted on frame 12. A cam plate 42 is rigidly secured to gear 40 to rotate therewith.

A pair of pitman rods or arms 44 (crankshafts) have a lower end 46 pivoted to cam plate 36 and an upper end 48 rigidly connected to crosshead or injector head 50 by belts 51.

Figure 3:
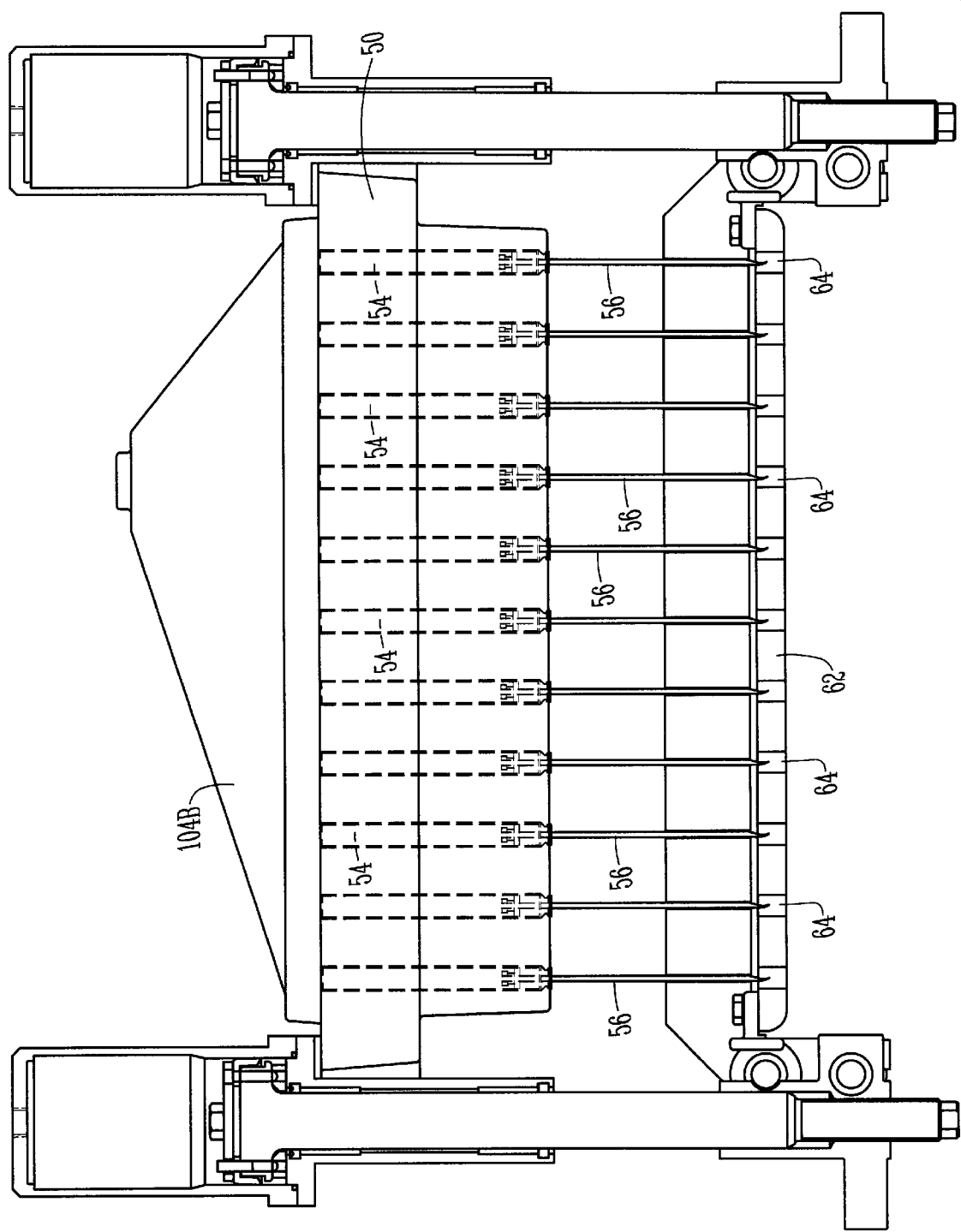
FIG. 3 is an end elevational view of the injector head as viewed from the right-hand side of FIG. 2.

A fluid reservoir 52 (FIG. 1) is mounted in any convenient way to frame 12. With reference to FIG. 3, injector head 50 has a plurality of vertically disposed fluid needle bores 54 which slidably receive hollow injector needles 56. The injector head 50 is slidably mounted on a plurality of guide posts 58. Compression springs 60 (FIG. 1) extend around the bottom end of guide posts 58 between the lower surface injector head 50 and the upper surface of stripper plate 62. The springs 60 normally urge the stripper plate downwardly with respect to the crosshead 50. The stripper plate 62 has a plurality of apertures. 64 (FIG. 3) to permit the needles 56 to move therethrough when the meat product is being injected with fluid.

Figure 8:
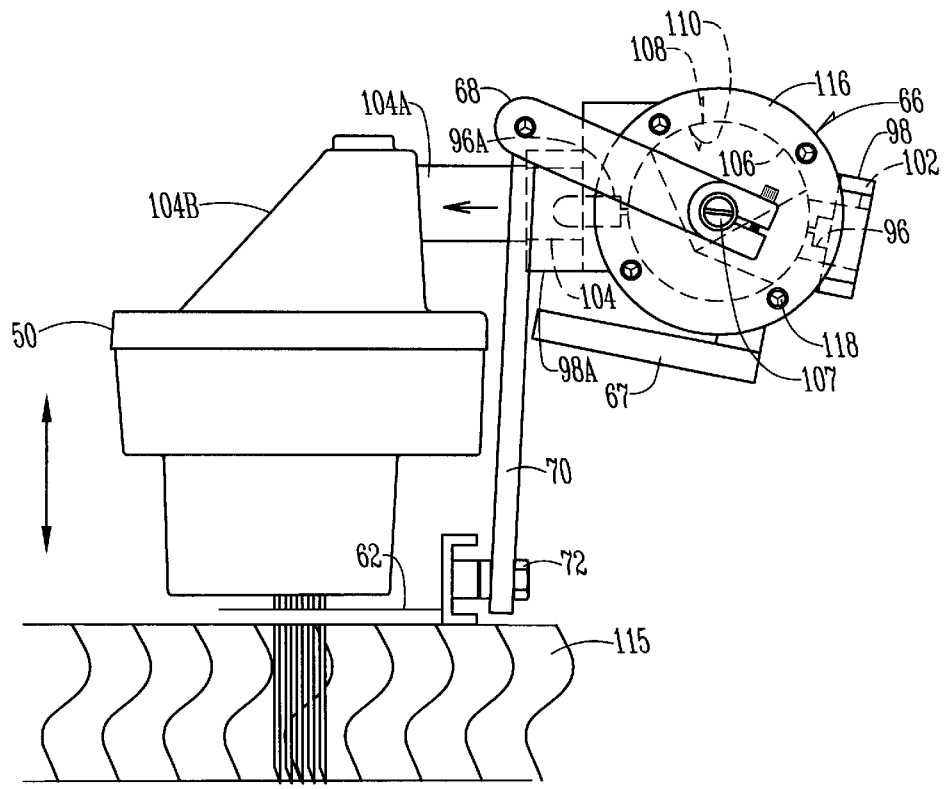
FIG. 8 is a side elevational view of the injector head and the valve showing the position of the injection needles and the valve control arm when needles are in the meat slab and the valve is supplying the fluid under pressure to the injector head.
Figure 9:
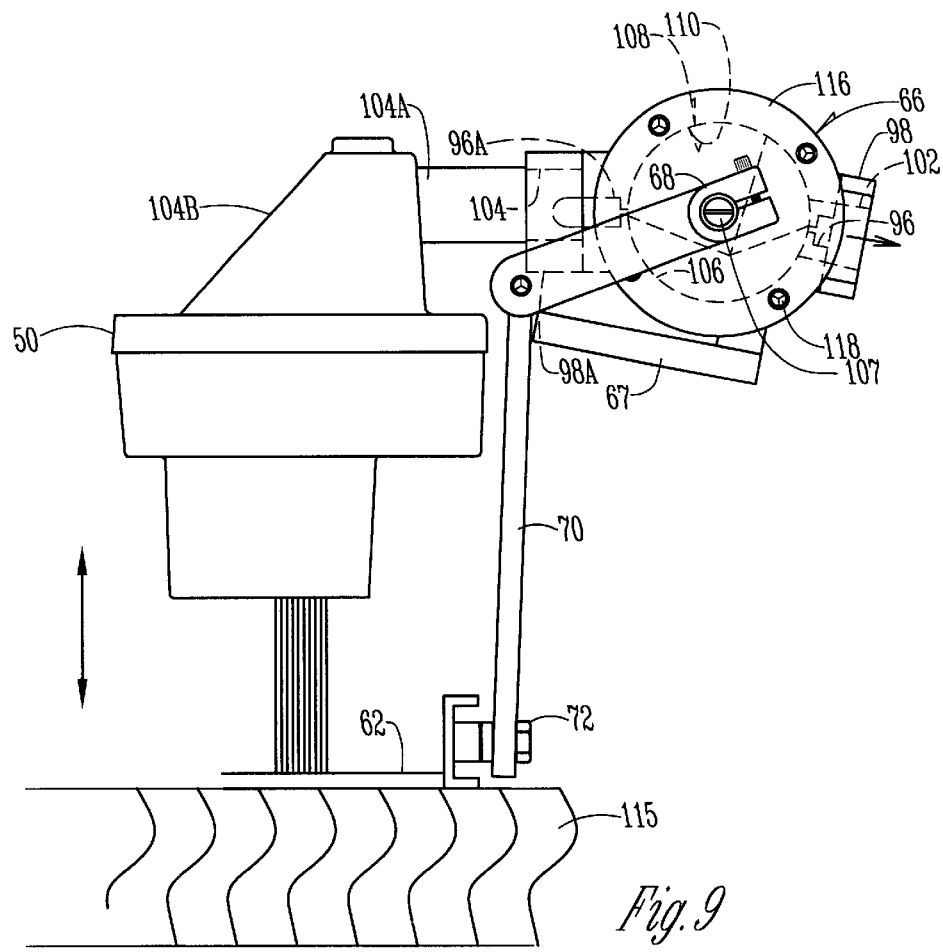
FIG. 9 is a view similar to that of FIG. 8 but shows the position of the injector head, the needles and the valve control arm when the needles are out of the meat slab and the valve is causing the brine to be returned to the fluid reservoir.

With reference to FIGS. 8 and 9, a valve 66 is mounted on a valve bracket 67 which in turn is supported by the frame 12. The valve 66 has a drive arm 68 which is adapted to move the valve to various operational positions as will be discussed hereafter. The drive arm 68 is pivotally connected to a vertically disposed connecting rod 70 at the upper end of the rod. The lower end of rod 70 is pivotally secured by pivot elements 72 to the stripper plate 62.

With reference to FIG. 1, the lower end of a piston rod 74 is connected by pivot element 76 to cam plate 42. A piston 78 (FIGS. 1 and 10) is mounted on the upper end of piston rod 74 within piston pump 80. An outlet line 82 extends from reservoir 52 and is connected to pump 80 by lines 84A and 84B which are located above and below, respectively, the piston 78. Check valves 86 are imposed in lines 84A and 84B to permit fluid in reservoir 52 to flow only in an inward direction into pump 80. The check valves 86 will not permit fluid to flow outwardly from the pump 80 towards the line 82 and reservoir 52.

Pump pressure lines 88 extend from pump 80 to valve 66. One line 88 (FIG. 10) is connected to pump 80 above piston 78, and the other pressure line 88 is connected to pump 80 below piston 78. Check valves 90 are imposed in each of the pressure lines 88 to permit fluid to flow only away from pump 80 and not into pump 80. Again, with references to FIGS. 1 and 10, return lines 92 extend from valve 66 back to the reservoir 52, when the valve 66 is in one operational position as will be described hereafter.

Figure 4:
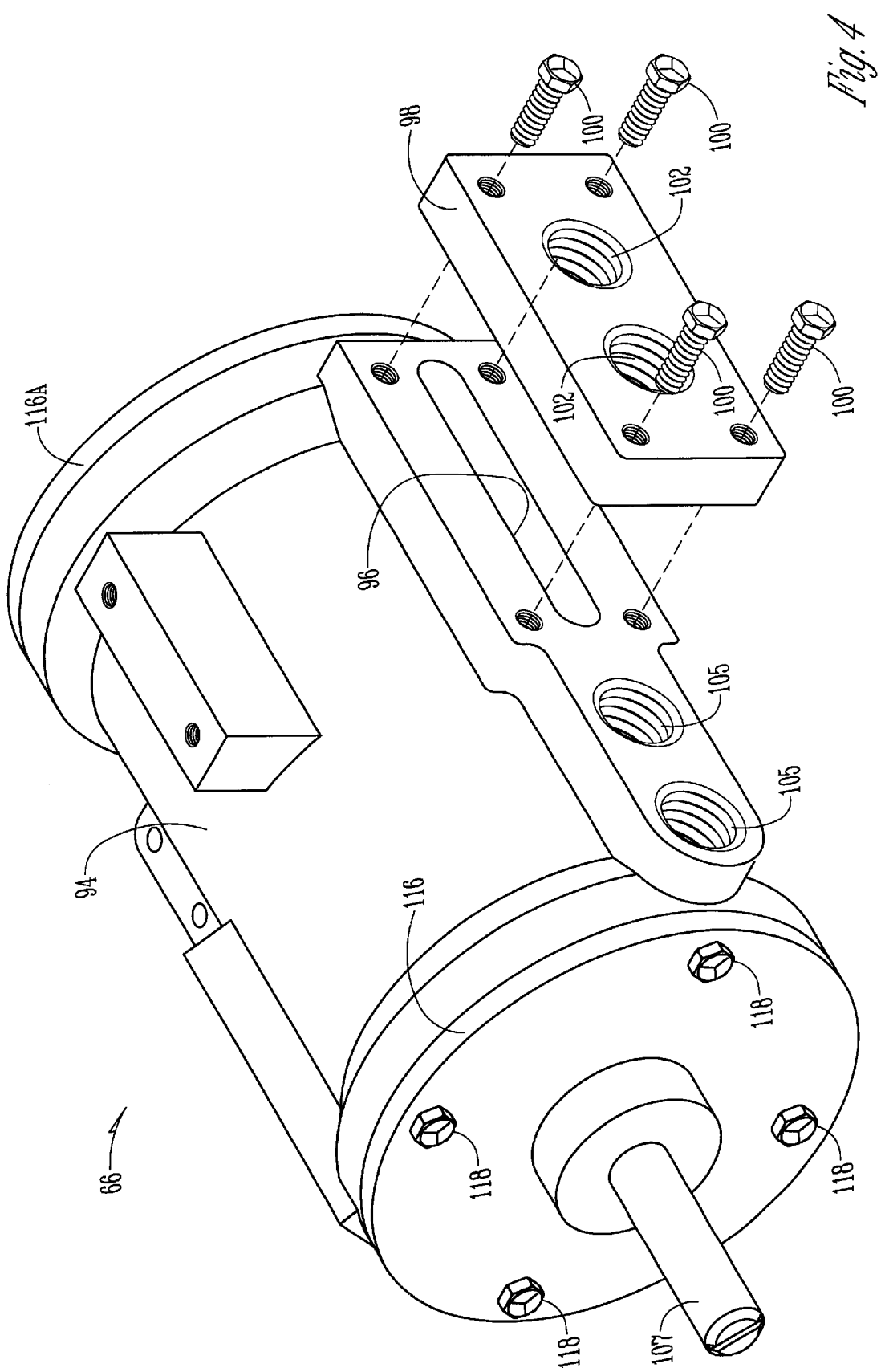
FIG. 4 is an enlarged scale exploded perspective view of the fluid valve that controls the flow of liquid brine in the injection machine.

The valve 66 is comprised of a valve housing 94 (FIG. 4) which has an elongated fluid inlet slot 96. Block 98 is secured by bolts 100 to the housing 94 and has a pair of fluid inlet ports 102 in communication with slot 96. Ports 102 are adapted to receive the upper ends of pressure lines 88.

Figure 6:
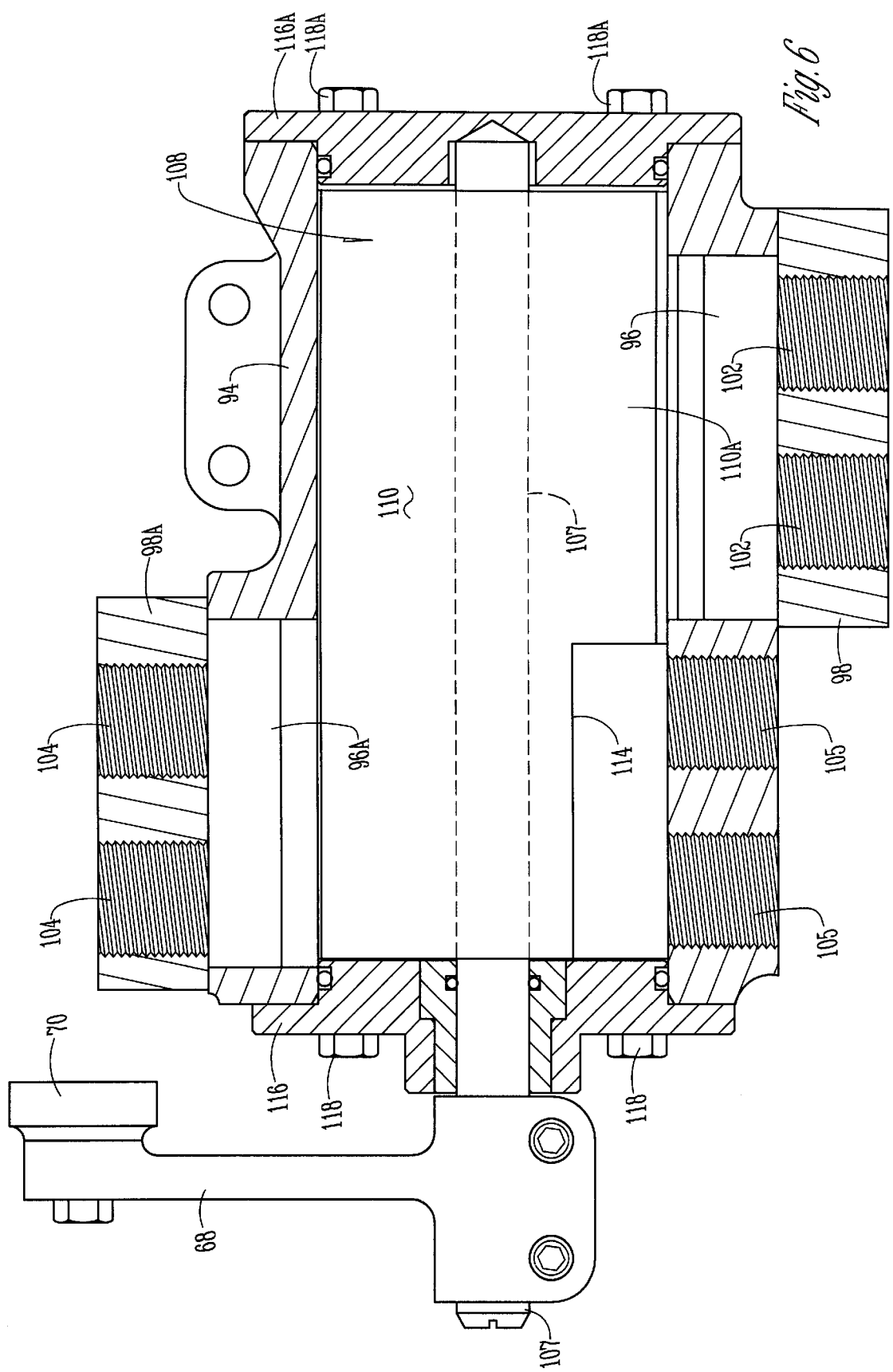
FIG. 6 is an enlarged scale longitudinal sectional view through the valve of FIG. 4 taken on line 6—6; of FIG. 7.
Figure 7:
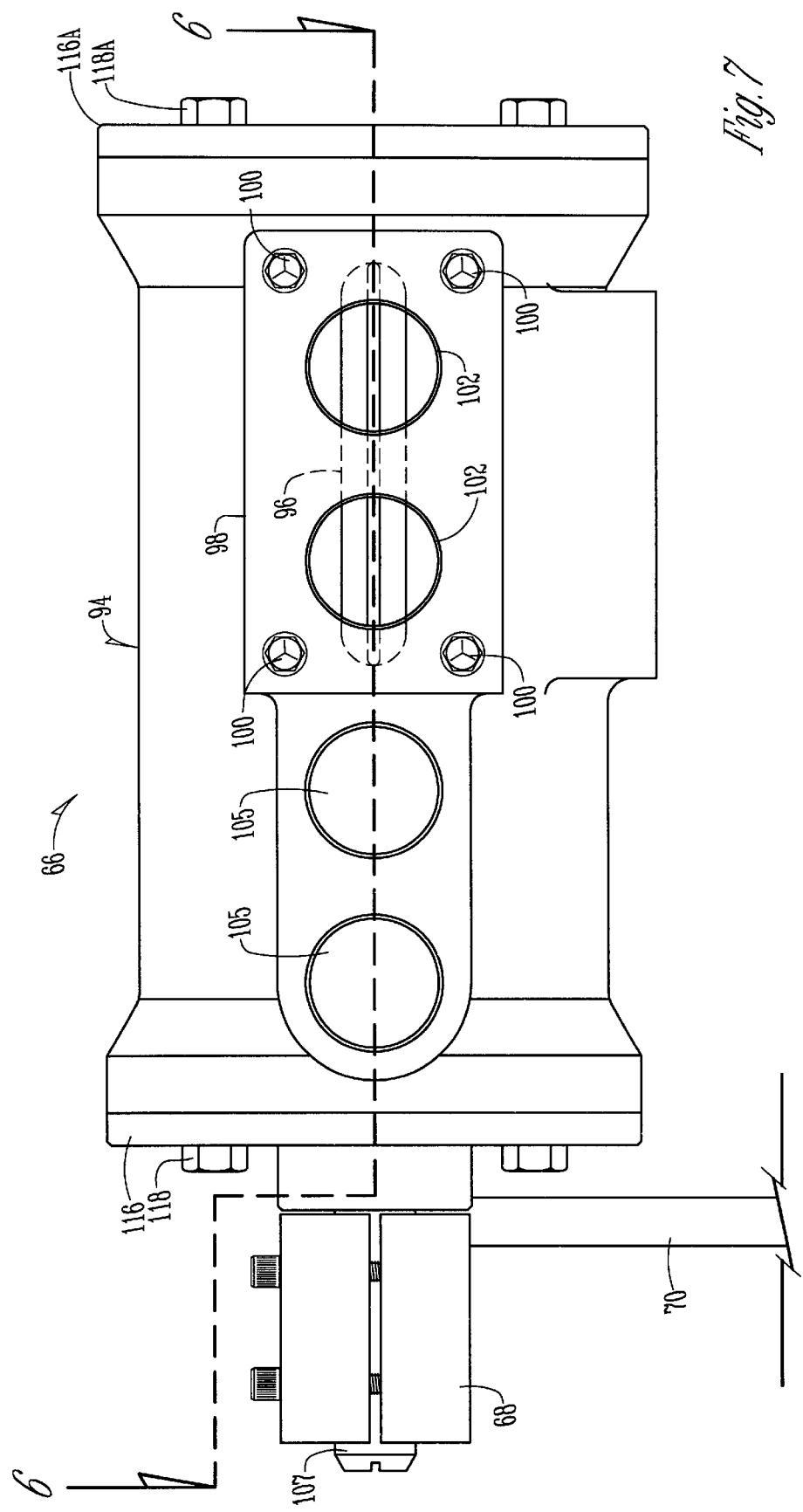
FIG. 7 is a side elevational view of the valve of FIG. 4 when assembled.

With reference to FIG. 6, valve housing 94 has two pressure outlet ports 104 which are connected by conduit 104A (FIGS. 8 and 9) to the fluid manifold 104B in injector head 50. Ports 104 are in block 98A and register with slot 96A in housing 94.

Valve housing 94 has a pair of fluid outlet ports 105 (FIGS. 4, 5 and 6) which receive the pair of lines 92 which extend back to reservoir 52.

Figure 5:
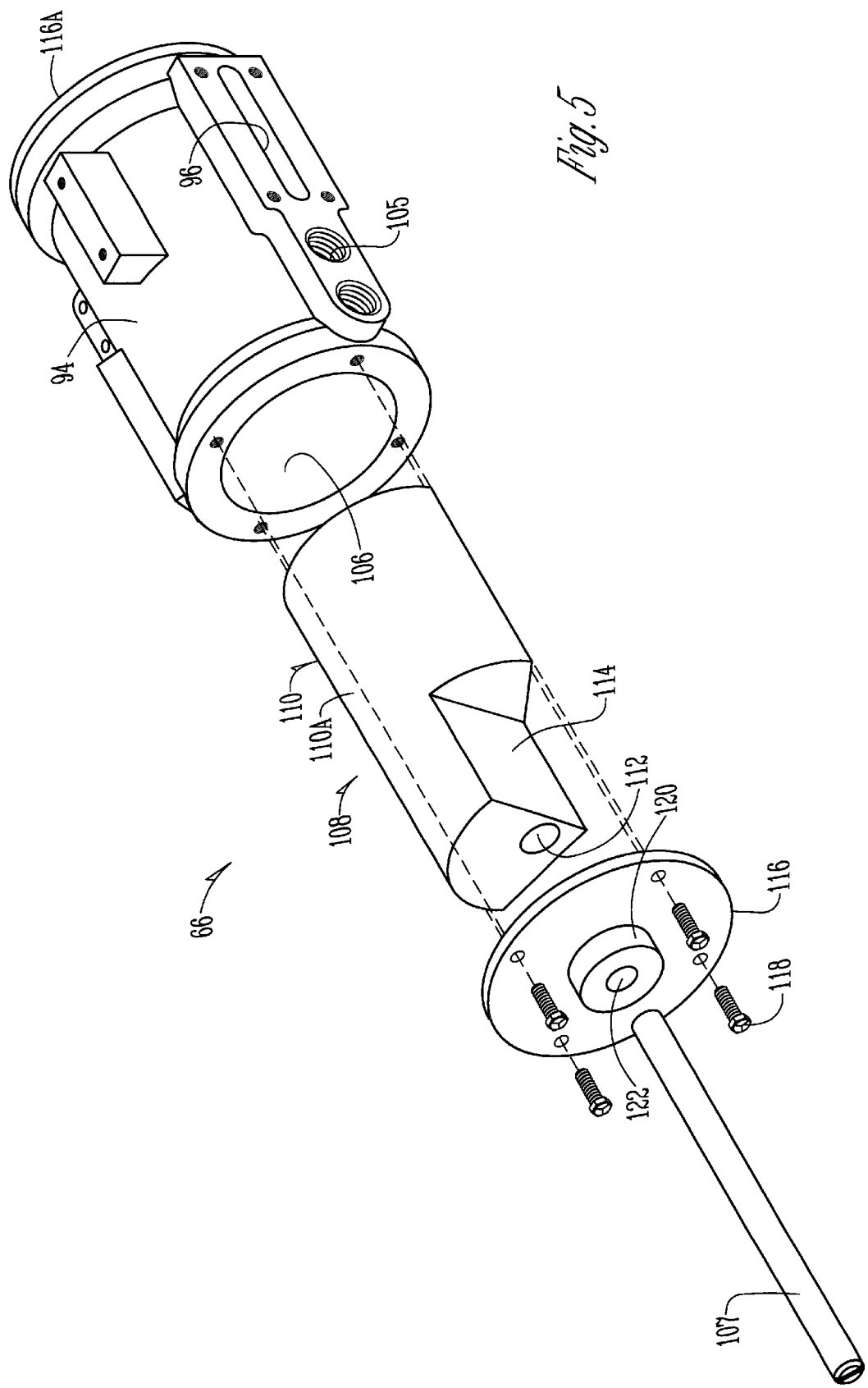
FIG. 5 is an exploded reduced scale perspective view of the components of the valve of FIG. 4.

Valve 66 and valve housing 94 have a center bore 106 (FIG. 5) with a laterally extending control shaft 107 centrally located on the center axis of bore 106. A valve spool 108 is secured to the inner end of shaft 107. Spool 108 has an arcuate surface 110 which spans approximately 160° of a circle (FIG. 5). Surface 110 has a valve surface 110A and a center axis bore 112 which receives the inner end of shaft 107. A longitudinal slot 114 is cut into spool 108.

With reference to FIGS. 8 and 9, the position of spool 108 (dotted line) in FIG. 8 shows the spool in a position that fluid entering ports 102 can move freely through the slot 114 to exit ports 104 so that fluid under pressure from pump 80 can move into the fluid manifold 104B of injector head 50. In that situation, the needles 54 have penetrated the meat slab 115.

When the spool 108 is in the position of the dotted lines in FIG. 9, the arcuate surface 110 has moved to a position to block the exit ports 104, whereupon the fluid under pressure entering ports 102 is diverted through slot. 114 so that it can exit the ports 105 and return to the fluid reservoir. In that situation, as shown in FIG. 9, the injection needles 54 are removed from the meat slab 115.

Valve housing 94 has an end plate 116 (FIG. 5) which is secured to one end of the housing by screws 118. An opposite end plate 116A is secured to the other end of housing 94 by screws 118A (FIGS. 5 and 6). The end plate 116 has a central hub 120 with an aperture 122 therein to receive the control shaft 107.

Figure 10:
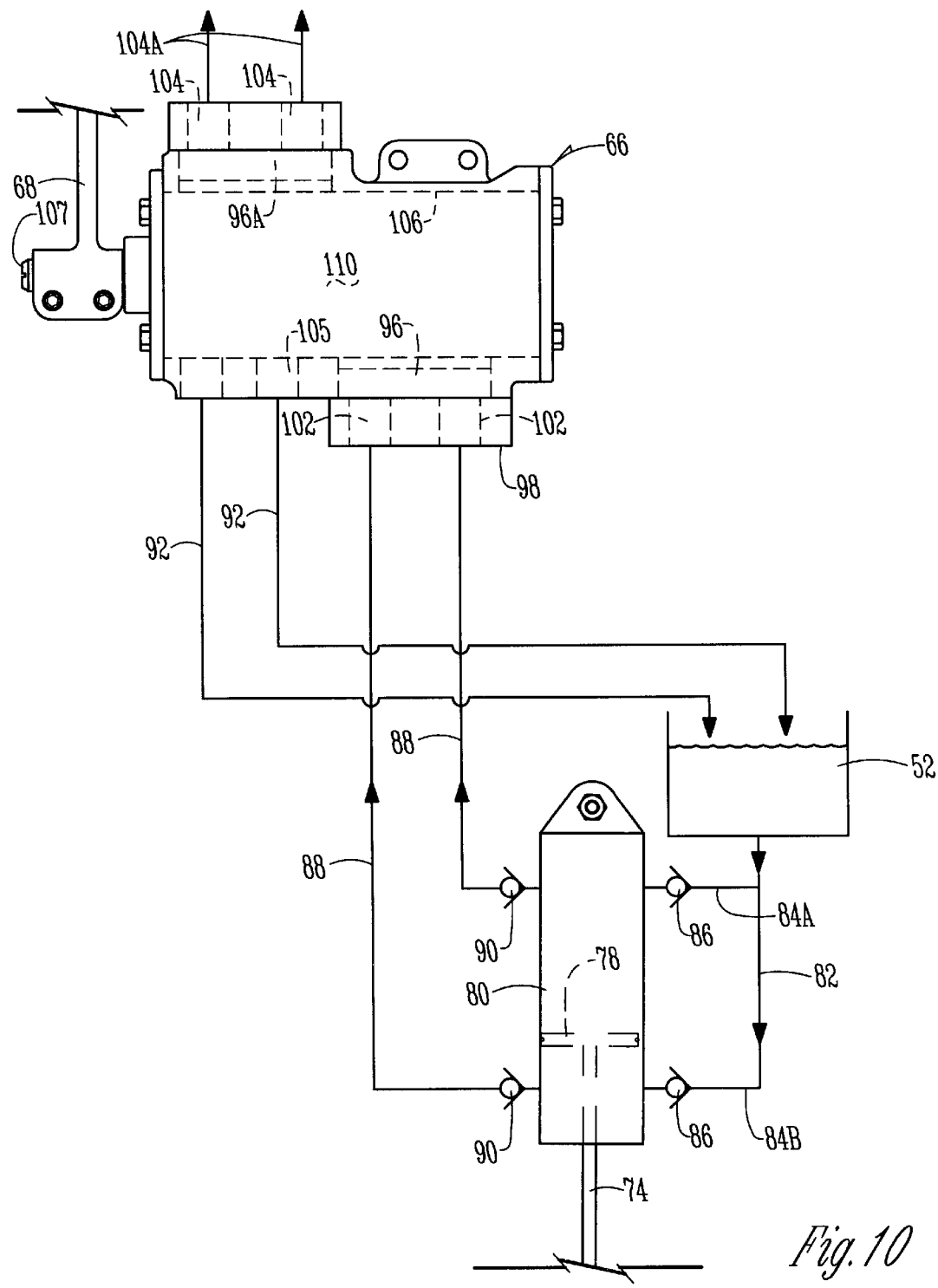
FIG. 10 is a schematic view showing the fluid circuitry of the injection machine.

With reference to FIGS. 1 and 10, a horizontally disposed spring 124 has one of its ends secured to pitman rod 44 and the other end secured to frame 12. A cam plate 126 is rotatably mounted on a horizontal shaft 128 which is supported by frame 12. A gear 130 is also mounted on shaft 128 and is rigid with cam plate 126. A chain 132 encircles gear 130 and the gear 34' on shaft 35 so that the cam plate 126 will rotate. By virtue of its engagement with rod 44, induced by the spring 124, the rotation of cam plate 126 will cause the rod 44 to alternately pivot back and forth about its lower end 46, thus, causing the injector head 50 to also move longitudinally back and forth with the upper end of rod 44. It should also be noted that by virtue of the lower end of the rod 44 being pivotally connected to the cam plate 36, the injector head will also move upwardly and downwardly as the lower end of rod 46 moves from a six o'clock position to a twelve o'clock position with respect to the cam plate 36.

Figure 2:
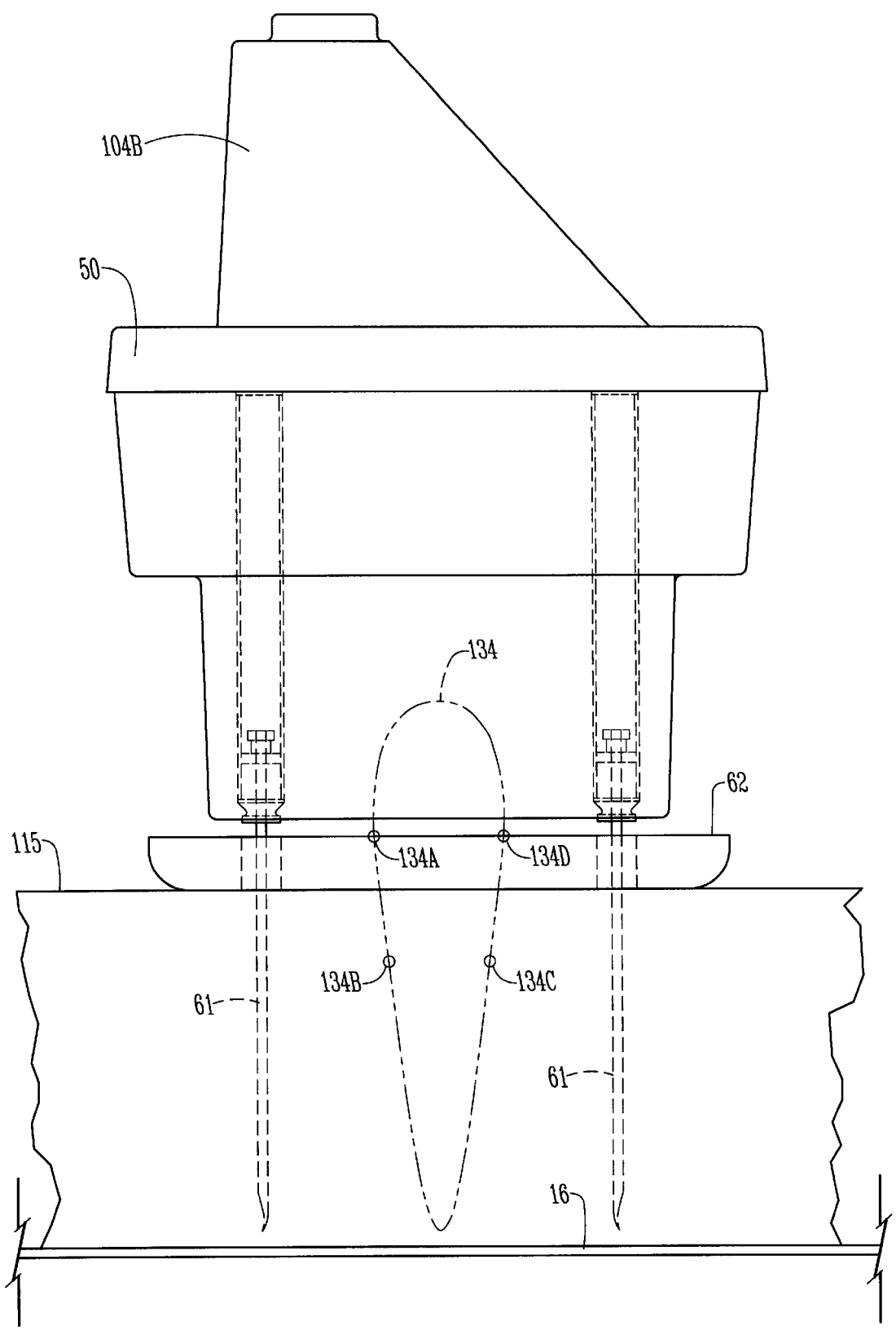
FIG. 2 is an enlarged scale side elevational view of the injector head.

The foregoing action causes the tips of the needles 56 to follow the elliptical path 134 shown by the dotted lines in FIG. 2. Line 134 is the locus of points of the tips of the needles 56 as they move through one cycle of the rotation of cam plate 36. Point 134A (FIG. 2) indicates the position of a needle as it commences to penetrate the meat slab 115; point 134D indicated the position of the needle when it is halfway through its penetration cycle; point 134C indicates the position of the tip of the needle when it is halfway withdrawn in the withdrawal cycle; and point 134D indicates the position of the tip of the needle when it is withdrawn from the meat slab.

In operation, it should be noted that the cam plates 36 and 42 are of the same size as are the gears 34 and 40, respectively, which are secured thereto. This causes the pitman rods 44 and the piston rod 74 to move in unison as the cam plates 36 and 42 are rotated. Thus, the double acting adjustable stroke pump 80, by being crank driven, always provides fluid flow proportional to the needle velocity which is determined by the movement of the crank or pitman arms 44. The result of this phenomenon is that the fluid volume output of the pump 80 is programmed to correspond with the speed of the needles 56 so that the volume of fluid injected into the meat slabs 115 will be uniform and equal throughout regardless of the variation of the velocity of the needles. Further, since the conveyor belt 16 is continuously moving, resulting in the continuous movement of the slabs 115, the intermittent of meat slabs of conventional machines is eliminated which thus reduces the inertial forces at play, resulting in a much smoother operation of the machine. Because the conveyer 16 and the slabs 115 are moving at a constant speed, the operation of the pitman rods 44, as previously described, cause the injector head 50 and the injector needles 56 to move forward with the conveyor 16 and the slabs 115. This arrangement of structure, as previously described, permits the injector head 50 and the needles 54 to move forward with the slabs at the same speed any time that the needles are being inserted or pulled out of the slabs. Then, as the injector head 50 and needles 56 continue their upward stroke above the slabs, the injector head 50 is moved back to the starting position and the needles 56 move down to the slabs. The injector head 50 and needles 56 still continue to move by the above-described crank action that starts from zero velocity at the upper end of the stroke and gradually increases to a maximum velocity in the middle of the stroke. The velocity then decelerates to zero velocity at the bottom of the stroke, and then accelerates, to a maximum velocity before decelerating again to zero velocity at the top position of the stroke. This arrangement allows for conveyor 16 and the slabs 115 to move at a continuous, constant velocity. While the needles 56 are penetrating and then withdrawing from the slab 115, they inject, fluid on the way in and on the way out of the slab, but only while they are within the slab.

With reference to FIGS. 8 and 9, it is seen that the stripper plate 62 through rod 70 and drive arm 68 cause valve 66 to move to the position of FIG. 8 at the bottom of the stroke so that pressurized fluid is provided to the injector head 50 to cause fluid under pressure to move through the needles 56 into the slab 115 while the needles are penetrating the slab. Conversely, when the needles move out of the slab (FIG. 9) as the injector head 50 rises, the rod 70 pulls drive arm 68 downwardly which moves the valve 66 to a second operational position wherein fluid flow to the injector head 50 is stopped and the flow of pressurized fluid is directed back towards the fluid reservoir 52.

Figure 11:
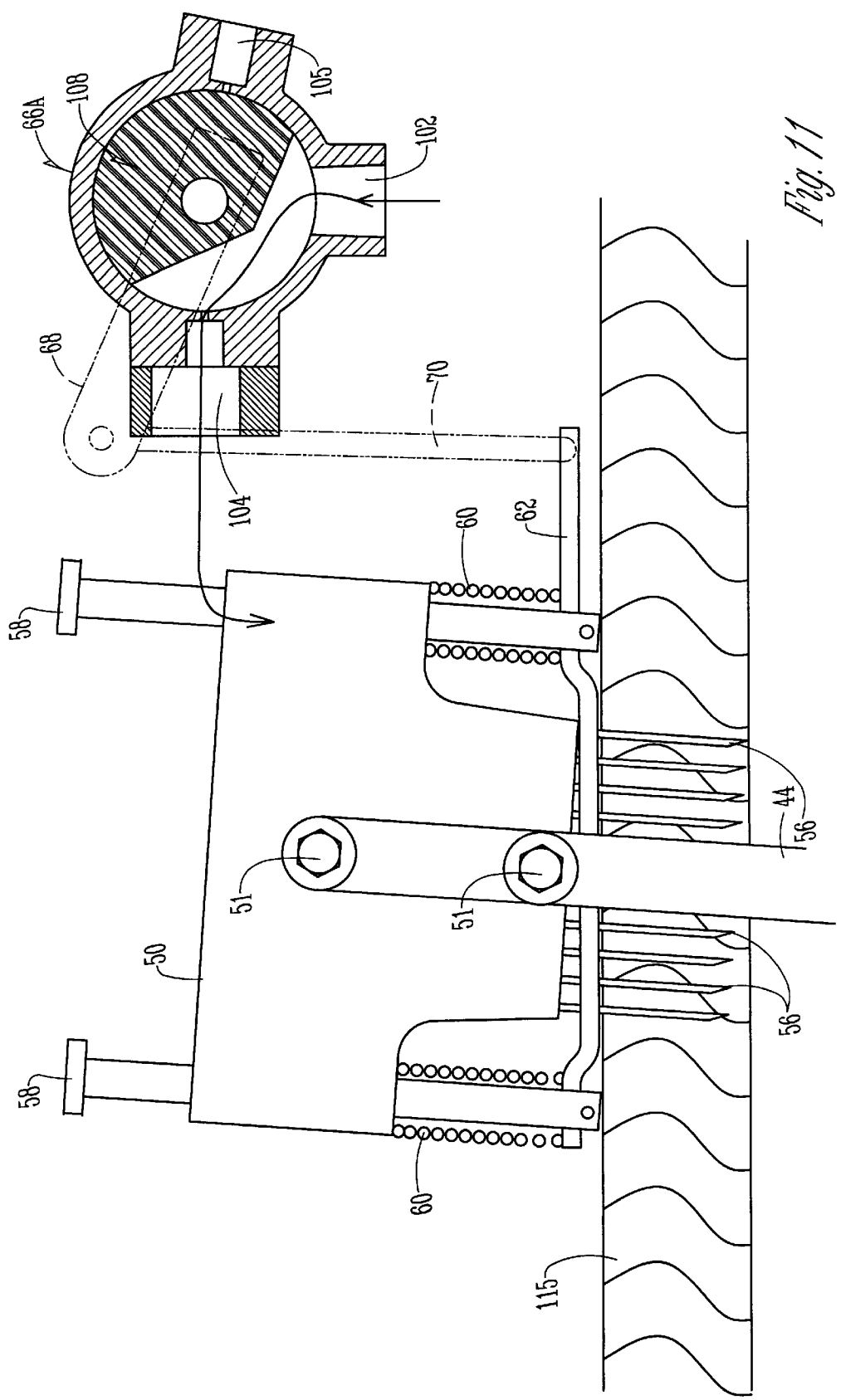
FIG. 11 is a view similar to that of FIG. 1B but shows a slightly modified valve.
Figure 12:
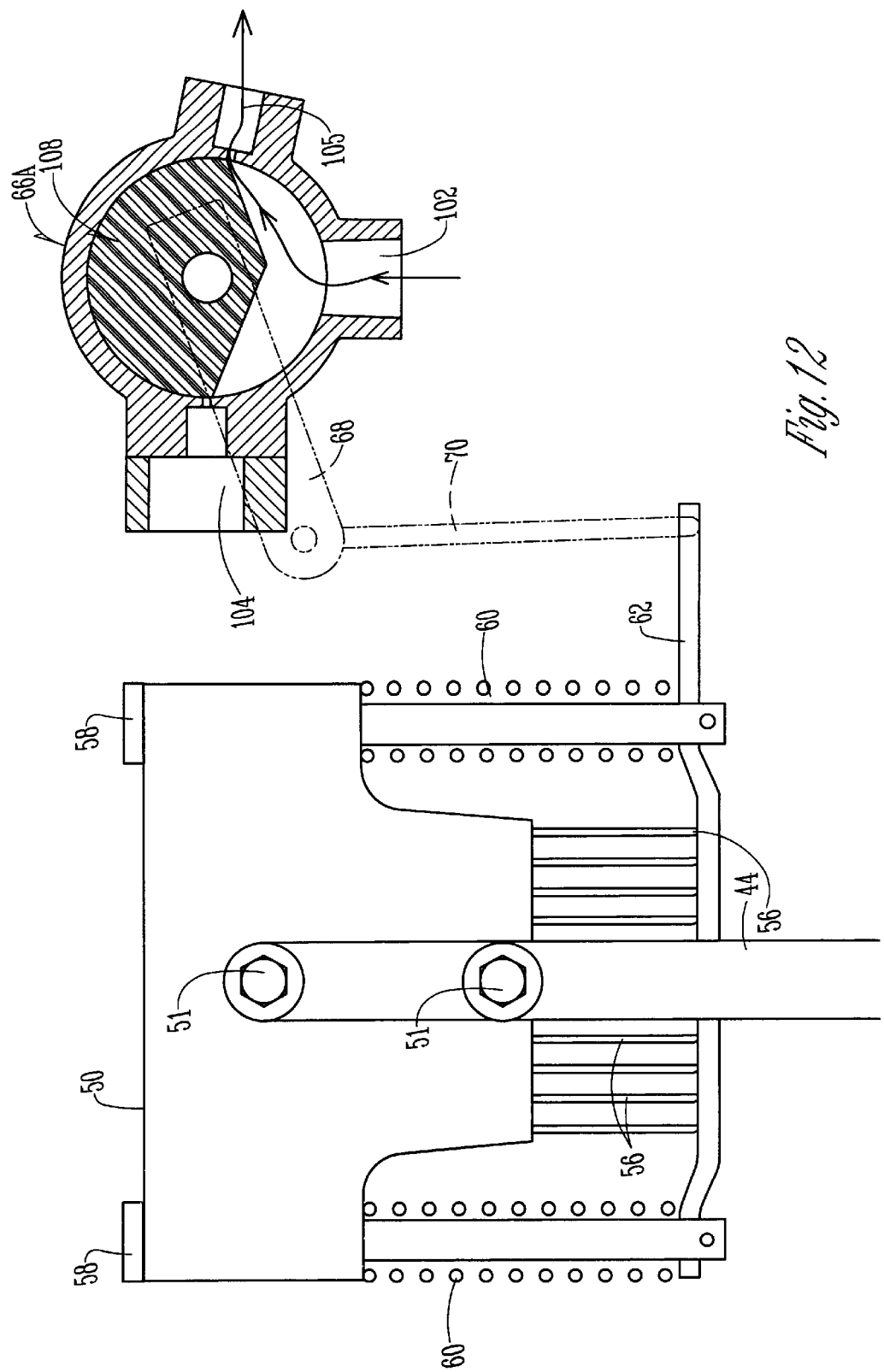
FIGS. 12–16 are views similar to that of FIG. 11 but show the valve in different sequential operational positions.
Figure 13:
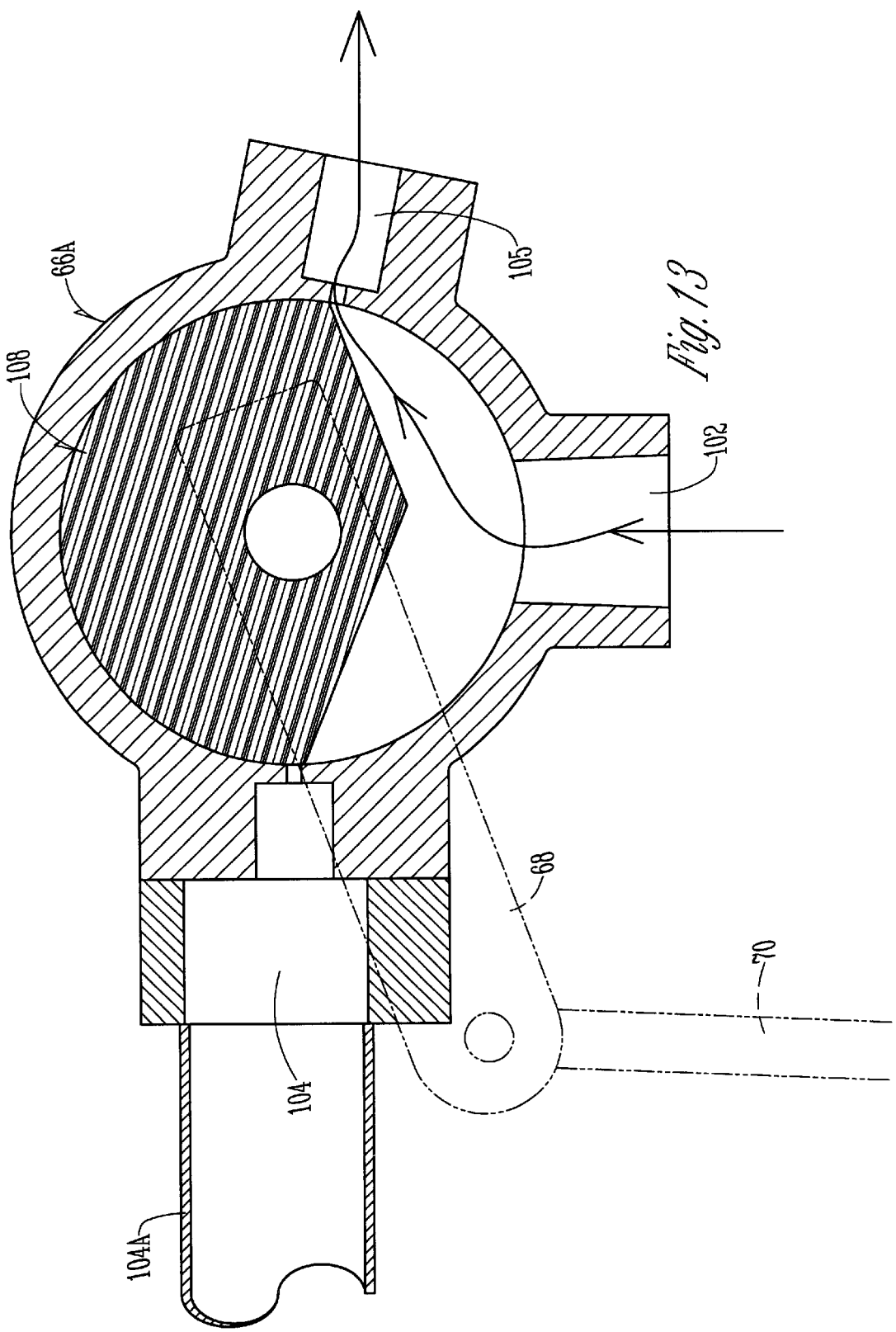
Figure 14:
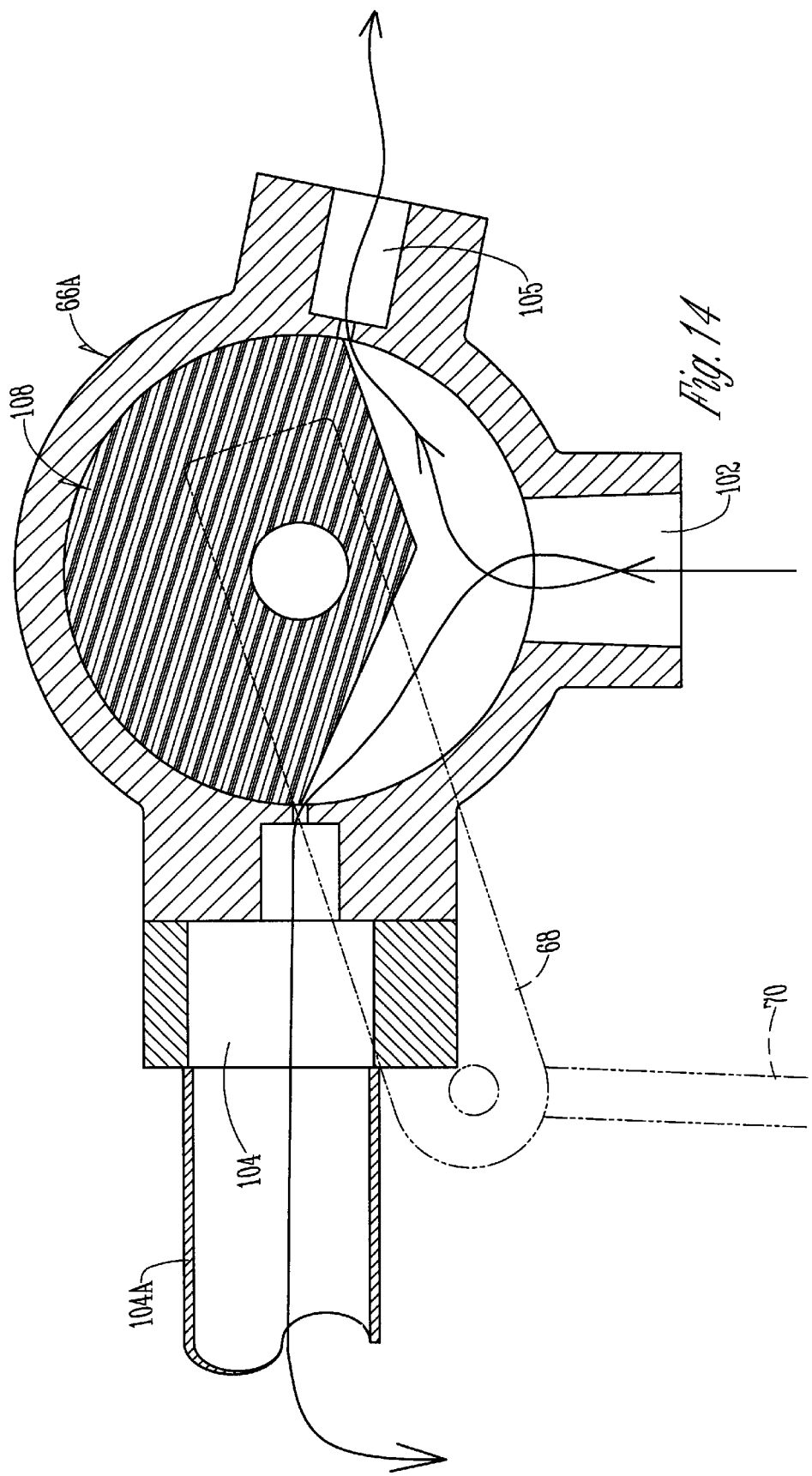
Figure 15:
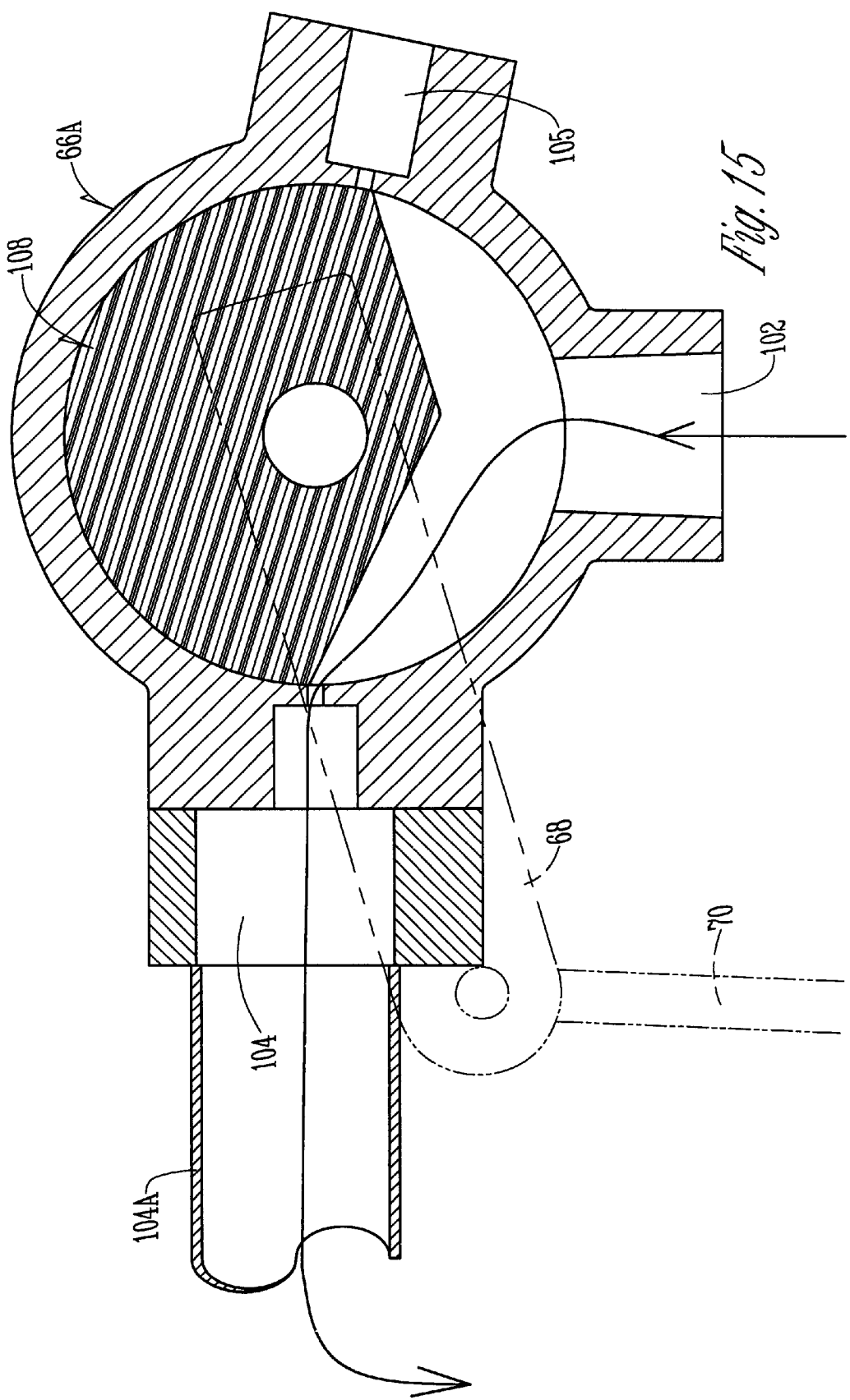
Figure 16:
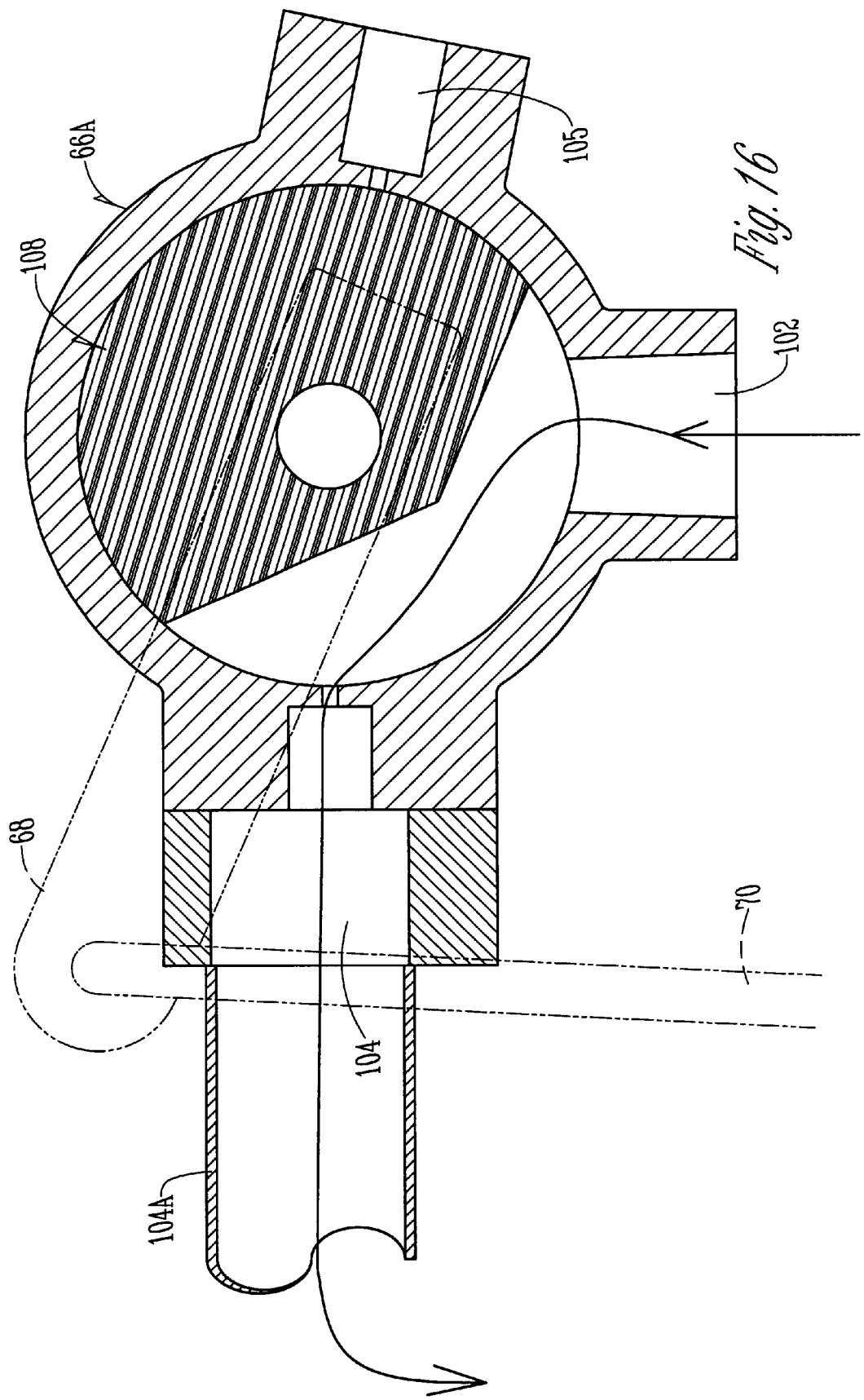

FIG. 11 shows a modified valve 66A showing the position of the valve when the pickle (fluid) flows into the needles. FIG. 12 shows the position of the valve 66A as the pickle flows back to the reservoir. FIGS. 13–16 show the operation of the valve at different stages. FIG. 13 is for the returning state when needles are out of pork bellies, the stripper plate is at the down position and pickle is directed back to reservoir. FIG. 14 is for the transient state when bellies start pushing the stripper plate upward and pickle could flow in both directions a this moment. FIG. 15 is for the injecting state when needles are penetrating into pork bellies and pickle is directed only into needles. FIG. 16 is also for the injecting state while needles are penetrating deep into bellies and the stripper plate is at the top position, whereupon pickle is directed only into needles.

Therefore, it is seen that this invention will achieve at least all of its stated objectives.

What is claimed is:

1. A method of injecting fluid into a meat product, comprising, continually and longitudinally moving a meat product having an upper surface through a meat injection station, and injecting a fluid at spaced points over said upper surface into said meat product while said meat product is on and moving through said meat injection station, moving a battery of fluid injection needles connected to a source of fluid into and out of a meat product on said injection station at a variable speed, coordinating the volume of fluid injected through said needles with the variable velocity of said needles so that fluid is uniformly discharged from said needles into a meat product on said meat injection station in spite of the varying speed of said needles.

2. The method of claim 1 wherein said needles are raised and lowered towards and away from said meat injection station in a circular path.

\* \* \* \* \*